Dec. 8, 1953 W. KENAN 2,661,488
TRUSS BRACING SYSTEM FOR VERTICAL STABILIZATION
OF PIPE LINE SUSPENSION BRIDGES
Filed July 27, 1951 7 Sheets-Sheet 1
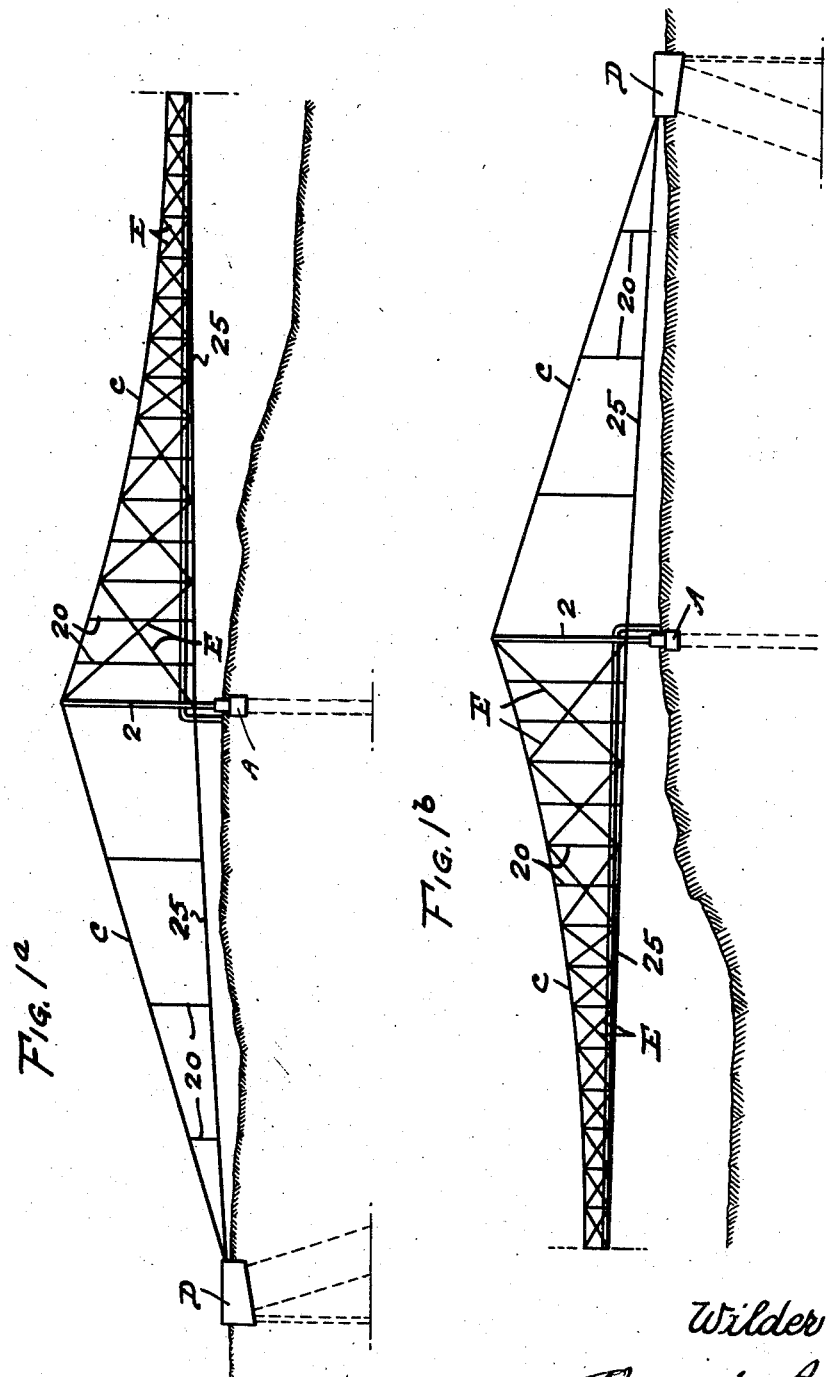
INVENTOR
Wilder Kenan
BY Ralph T. Barrett
ATTORNEY

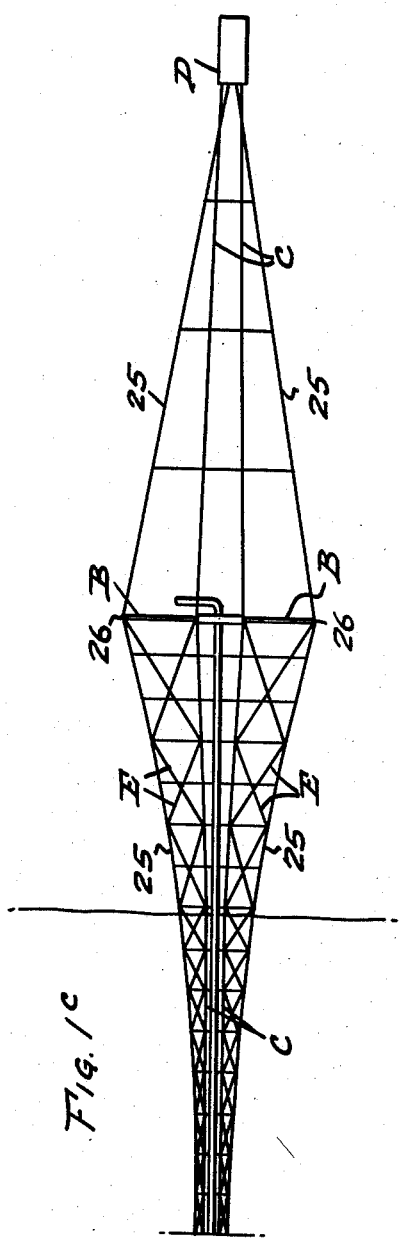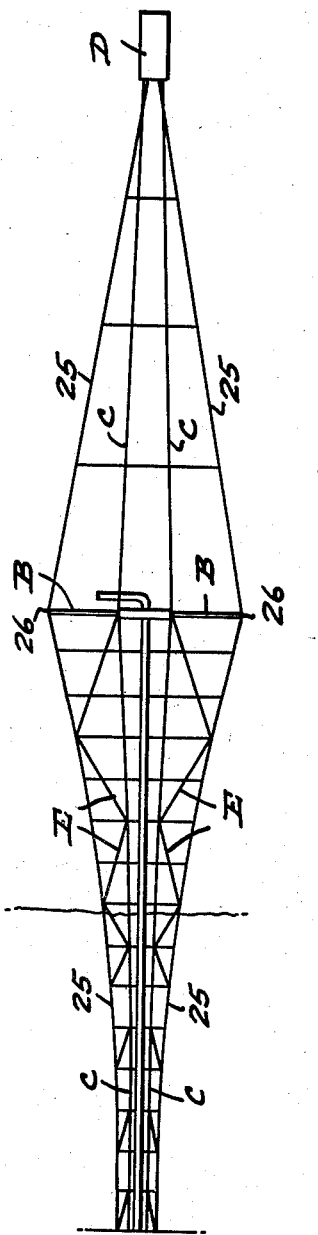

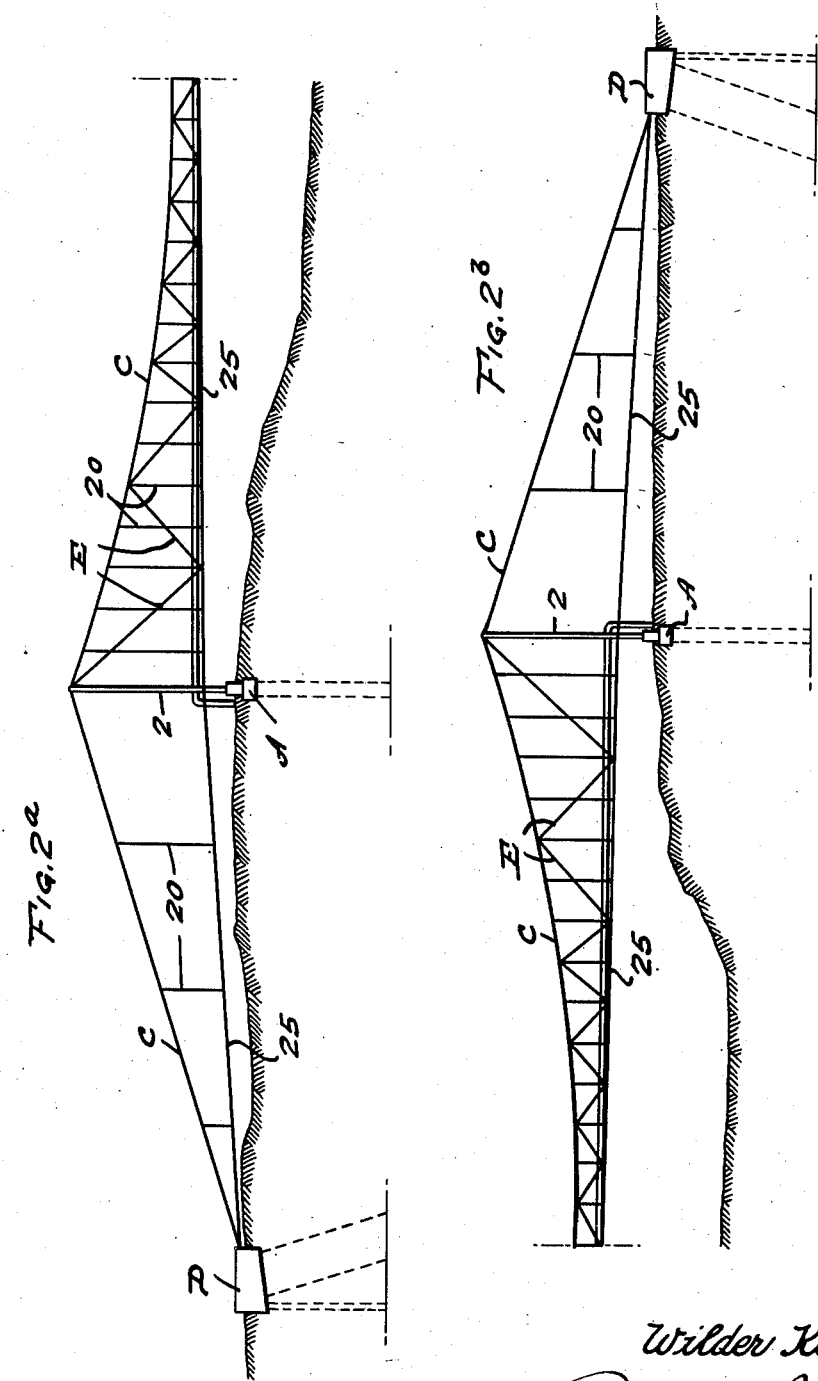

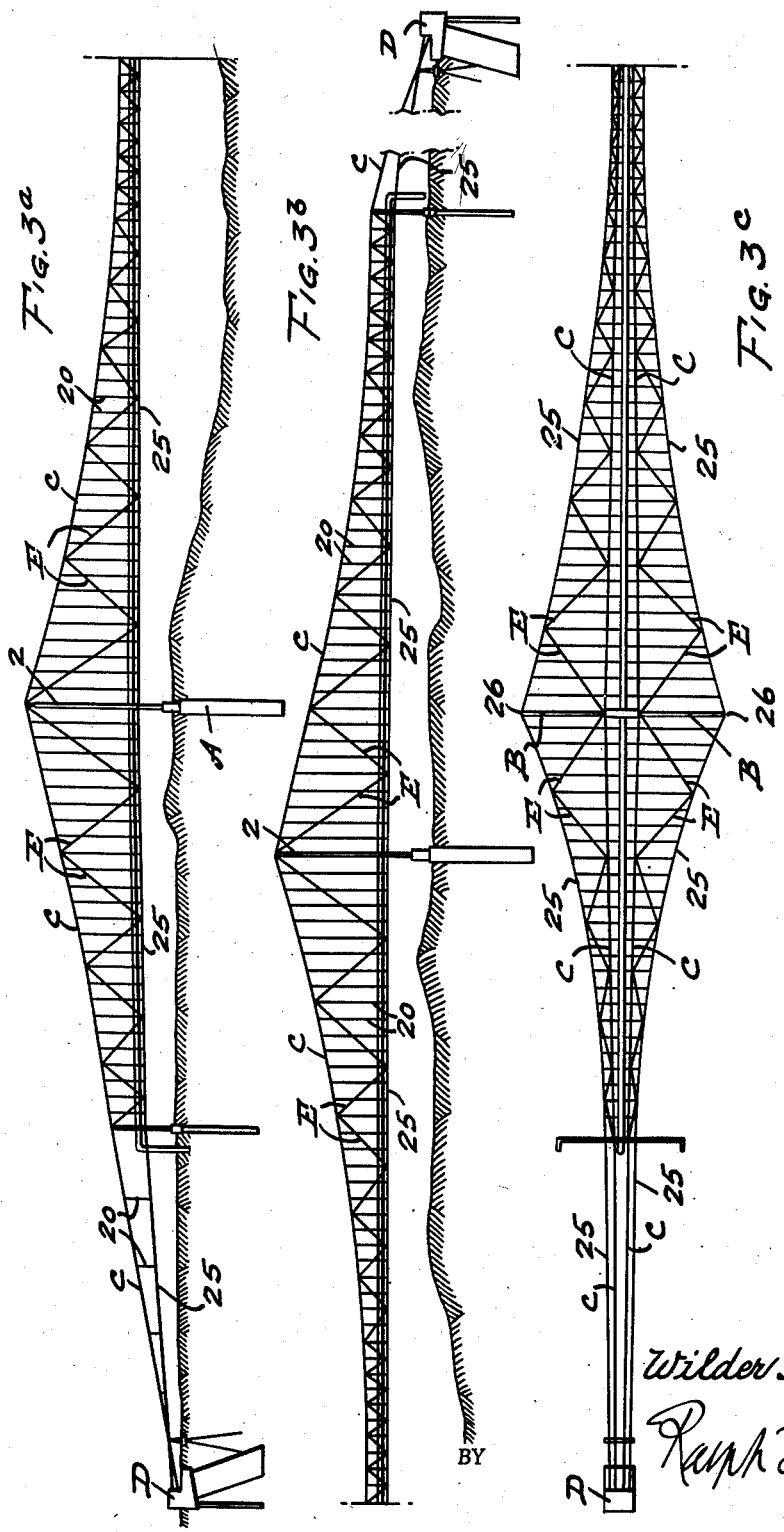

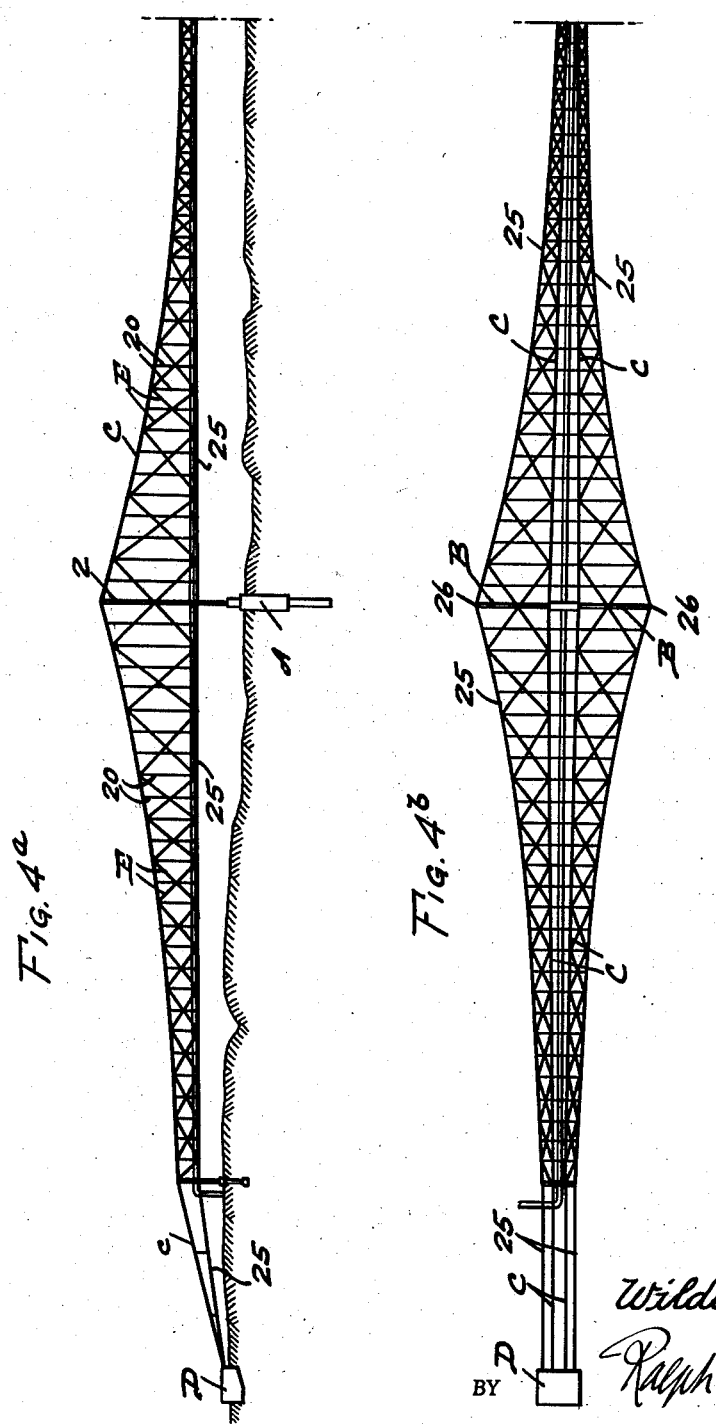

Dec. 8, 1953 W. KENAN 2,661,488
TRUSS BRACING SYSTEM FOR VERTICAL STABILIZATION
OF PIPE LINE SUSPENSION BRIDGES
Filed July 27, 1951 7 Sheets-Sheet 6
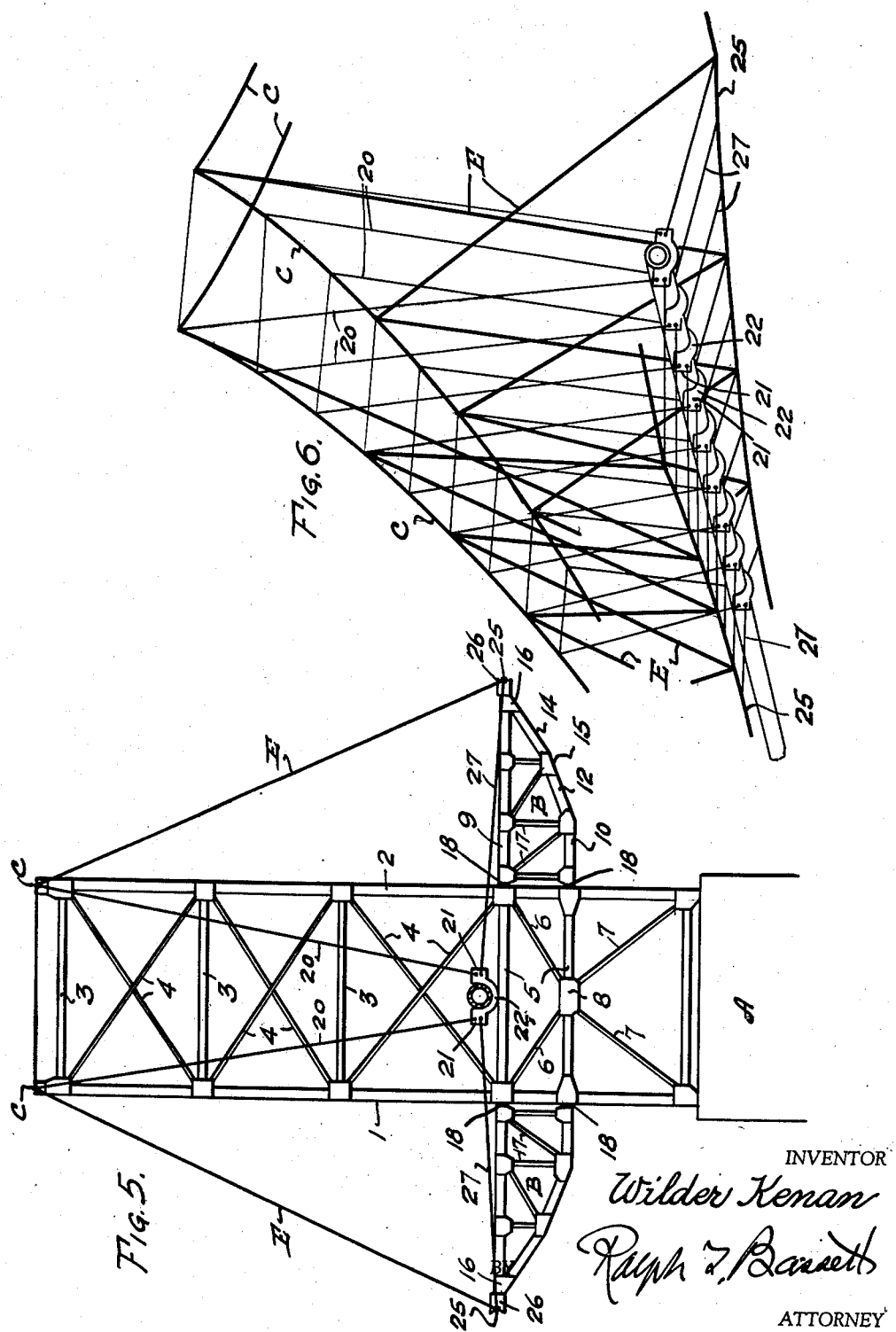
INVENTOR
Wilder Kenan
Ralph T. Bassett
ATTORNEY Dec. 8, 1953 W. KENAN 2,661,488
TRUSS BRACING SYSTEM FOR VERTICAL STABILIZATION
OF PIPE LINE SUSPENSION BRIDGES
Filed July 27, 1951 7 Sheets-Sheet 7
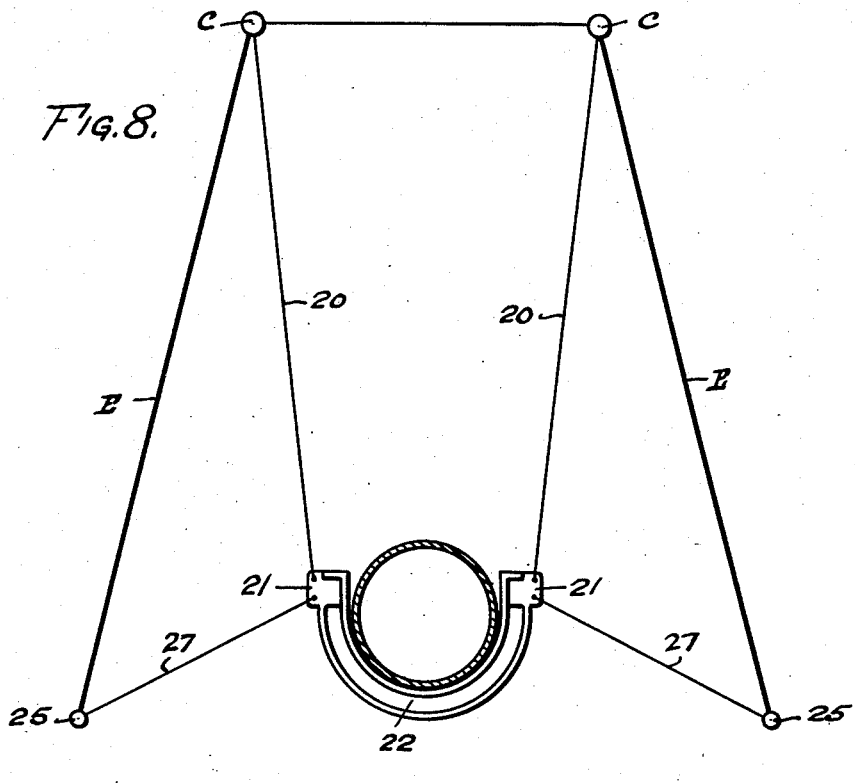
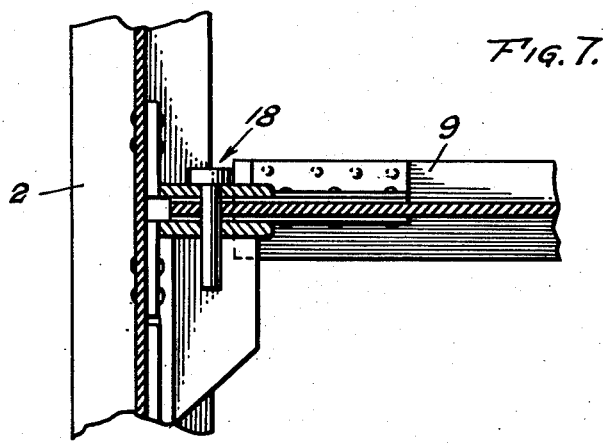
INVENTOR
Wilder Kenan
BY Ralph L. Bassett
ATTORNEY Patented Dec. 8, 1953

2,661,488

UNITED STATES PATENT OFFICE 2,661,488

TRUSS BRACING SYSTEM FOR VERTICAL STABILIZATION OF PIPE LINE SUSPENSION BRIDGES

Wilder Kenan, San Antonio, Tex.

Application July 27, 1951, Serial No. 238,859

3 Claims. (Cl. 14—19)

This invention relates to improvements in areodynamic and unbalanced vertical loading stabilizations of pipe line bridge construction of the suspension type, such as shown in my prior Patent No. 2,221,919, dated November 19, 1940.

During recent years it has been found economically advantageous to substantially increase the diameters of transmission pipe lines which are being installed throughout the country. It is generally understood that a horizontal cylinder in a uniform air stream approximates a perfect airfoil until the diameter exceeds approximately 20 inches, when increasingly the phenomenon of aerodynamic instability develops; and inasmuch as pipe lines are now being installed using up to 36 inch diameter pipe, the matter of aerodynamic instability eventually became of such serious proportions that a remedy became necessary to insure against vertical oscillations of such magnitudes and frequencies that the pipe line or pipe lines would be exposed to the hazard of immediate or eventual rupture resulting from excessive flexing or vibration fatigue.

The present invention comprehends the provision of a bracing system in the nature of diagonal members which are interposed between and attached to the main cables and the wind cables on each side of the bridge center line which function as trusses in damping aerodynamically induced vertical oscillations and materially reducing vertical distortions incident to unbalanced vertical loadings.

One of the features of this invention is inducing in the bracing system initial tensions of requisite magnitude upon the theory that a member under tension is elastically equivalent to a compression member until such time as it may become slack, it being understood that in the bridge construction comprehended, the main cables function at all times under tensions of great magnitude induced by the vertical gravity loadings of the bridge suspended structure, while the wind cables, in their erection, are regularly subjected to initial tensions of approximately 20% of the ultimate strength thereof for proper performance in their primary function as wind cables.

A further object, therefore, is to introduce diagonal members of requisite initial tension resulting from so positioning the wind cables in planes inclined upward from their points of support at the bridge structure towers to the bridge center line as to thereby develop downward vertical components of the wind cable tensions consequent to the vertical angle changes in the wind cable parabolic curve at these points.

Another object of the invention is the provision in a bridge structure of the type in question including main cables and wind cables of a truss bracing system capable of use either with single diagonals or double diagonals involving single intersections.

A further object of the invention is the utilization of the main bridge cables and wind cables as the top and bottom chords, respectively, and in conjunction with a truss bracing system utilizing a plurality of diagonals.

Other objects of the invention will more clearly hereinafter appear by reference to the accompanying drawings forming a part of this application, in which like characters of reference designate corresponding parts throughout the several views, in which:

Figs. 1ª and 1ᵇ illustrate side elevations of a single span pipe line suspension bridge involving a double system of diagonals with single intersections of each set;

Fig. 1ᶜ is a top plan view of the disclosure of Fig. 1ᵇ;

Figs. 2ª and 2ᵇ disclose side elevations of a single span pipe line suspension bridge with a single system of diagonals;

Fig. 2ᶜ is a top plan view of Fig. 2ª;

Fig. 3ª and Fig. 3ᵇ are side elevations of a multiple span pipe line suspension bridge utilizing the single system of diagonals;

Fig. 3ᶜ is a top plan view of Fig. 3ª;

Fig. 4ª shows a side elevation of one section of a multiple span pipe line suspension bridge using the double system of diagonals with a single intersection of each set;

Fig. 4ᵇ is a top plan view of Fig. 4ª;

Fig. 5 is an end elevation of a single structure such as shown in Figs. 2ª and 2ᵇ;

Fig. 6 is a fragmentary perspective of the structure for the single diagonal system such as shown in Figs. 2ª and 2ᵇ;

Fig. 7 shows the cantilever hinge structure; and

Fig. 8 is a transverse section through the suspension system.

The structure includes a plurality of supporting towers which are spaced and arranged in accordance with the overall length of the bridge structure. The towers are supported on piers A and include uprights 1 and 2 suitably spaced at each side of the piers A and cross braced by the vertically spaced, horizontal beams 3 and diagonals 4, the latter being connected at their intersection in the usual manner. The entire tower assembly may be built in any desirable manner and of suitable material such as beams, or the beam structure may be fabricated elements of such a nature as to provide sufficient and ample strength in assembly for supporting the load to which it may be subjected. The height of the towers and the nature of the footings supporting the towers will be determined by the load and the length of the intervening span. Cross beams 5 connect the uprights 1 and 2, these cross beams 5 being braced and supported in any suitable manner as by diagonals 6 and 7, the diagonals 6 connecting the beams 5, while the diagonals 7 converge from the base of the uprights 1 and 2 for connection with a fabricated plate assembly 8, which further accommodates the inner edge portions of the diagonals 6 between the beams 5.

Extending horizontally from that portion of the tower defined by the beams 5 are cantilever structures B, each of which includes the horizontal chords 9 and 10, the upper chord 9 projecting beyond the lower chord 10 and comprehending substantially the full length of the cantilever structure. The lower chord 10 of the cantilever assembly is connected to the outer extremity of the upper chord 9 by means of upwardly angularly extending connecting members 12 and 14 which are spliced together by a plate 15, with the element 14 connected with the outer end portion of the upper chord 9 by the plate 16. A plurality of vertical and angular brace members 17 complete the cantilever structure.

The cantilevers so formed are each hinged or pivoted to the uprights 1 and 2 of the towers, the dimensions of the cantilevers at their points of connection with the uprights being such that the hinges or pivots are substantially at the junction of the uprights and the cross beams 5. In the present disclosure, the pivot or hinge connections are indicated at 18. This structure is preferable in that it furnishes substantial strength at essential points in the assembly. However, it will be obvious to one skilled in the art that a modification of the details of assembly may be made without departing from the spirit of the invention.

The upper end portions of the uprights 1 and 2 of the pier structures are provided with saddles or the equivalent to provide guideways across which main supporting cables C extend. These cables C extend from anchors D beyond the end piers, as shown in Fig. 1b, overlying the grooved saddles at the top of the uprights throughout the bridge assembly. It will be noted at points intermediate the towers, the main supporting cables C, upon being placed across the saddles at the top of the uprights assume a catenary form and from these cables a plurality of suspenders 20 are supported, the suspenders 20 being connected at their lower ends to the ear portions 21 of the pipe cradles 22. The pipe cradles 22 may be of such dimension as to snugly receive the diameter of pipe which may be suspended and will be relatively arranged as to number in accordance with weight and other characteristics as comprehended by the general assembly.

Wind cables 25 are connected at their extremities to the anchors D at each end of the bridge structure and extend across grooved saddles 26 carried at the end of the cantilevers B. The wind cables 25 are connected to the pipe cradles 22 by connections or guy suspenders 27, and the connections and arrangement are such that the wind cables 25 when loaded by connection to the cradle retain the wind cables in parabolic form. This arrangement is best shown in Figs. 3c and 4b.

The details of construction of the saddles and cable connections form no part of the instant invention. These parts being in accordance with my prior Letters Patent heretofore mentioned.

The present invention comprehends a secondary utilization of the main cables C and the wind cables 25 on each side of the bridge center line as the upper and lower chords, respectively, of a truss bracing system, this system and secondary utilization consisting of the introduction of diagonal members E having end attachments to the main cables C and the wind cables 25. The diagonal members E have induced in them initial tensions of requisite magnitude inasmuch as a member under tension is elastically equivalent to a compression member until such time as it may become slack. Having provided initial tension in the diagonals E, these diagonals are associated with the main cables C which obviously function at all times under tension induced by vertical gravity loadings and with the wind cables which are initially subjected to tension of approximately 20% of the ultimate strength thereof. The arrangement of the main cables C and the wind cables 25 is such as to induce the requisite initial tension in the diagonal members, it being noted that the wind cables are positioned in planes inclined upward from their points of support at the bridge structure towers to the bridge center line to develop downward vertical components of the wind cable tensions consequent to the vertical angle which is in the wind cable's parabolic curve at this point. The diagonal web members E are oppositely inclined in a zigzag fashion and are generally in a plane through the main cables and wind cables, it being understood that the plane in question is not a flat plane but irregular due to the contour of the cables.

It will be noted that the ends of the cantilevers 10 to which are fixed the wind cables 25 lie in a horizontal plane below the supporting face of the saddles 22 so that the connections 27 between the wind cables 25 and the saddles 22 converge outwardly and downwardly.

It will also be noted that the diagonals of the truss bracing systems may have requisite initial tensions in the development of true truss action for the truss bracing systems. Such initial tensions in the diagonals are provided by the introduction of sufficient vertical camber or crown in the wind cable curve resulting in downward acting vertical components of the wind cable tensions at the points of attachments of the diagonals.

In each of the modifications the basic features essential to the accomplishment of the damping of vertical oscillations are provided, it being noted that the diagonals forming the truss bracing system are capable of arrangement in various forms in accordance with requirements. In some of the forms double systems of diagonal braces are provided between the main cables and the wind cables, these diagonal braces involving single intersections of each set. The connections of the braces with the main cables and the wind cables at each side of the vertical center line of the assembly lie in common vertical planes with the respective planes of the opposite connections at each side of the structure lying parallel to the adjacent plane. It will also be obvious from an inspection of Fig. 8 that the wind cables lie in a plane below the lowermost supporting face of the pipe cradles, so that the wind guy suspenders 27 extend from their connection with the cradle laterally and downwardly to the wind cable. As shown in Fig. 8 the connection of the wind guy suspenders is below the connection of the main suspenders, with the connections of the wind guy suspenders and the cradles in substantially the plane of the main suspenders. The provision of connecting means at the extremities of the braces forming the truss bracing system may be of any suitable form to facilitate their association in the assembly.

What I claim is:

1. A bridge structure including spaced towers, cantilever members mounted upon the towers and extending laterally therefrom, pipe cradles arranged between the towers, spaced main cables extending over the towers and anchored at points spaced outwardly therefrom, suspenders connecting the main cables and pipe cradles, wind cables connecting the end portions of the cantilever members at each side of the towers and being anchored at their ends at points spaced outwardly from the towers, said wind cables being upwardly inclined from the ends of the cantilevers to the central portion of the span, guy suspenders extending between said cradles and wind cables at spaced points therealong, web members oppositely inclined in zigzag fashion extending between the main cables and said wind cables, said wind cables, guy suspenders and diagonal web members each being tensioned flexible members.

2. The structure of claim 1 characterized in that the wind cables are upwardly and inwardly inclined from the ends of the cantilevers to the central portion of the span, and the guy suspenders extending between the cradles and the wind cables are of gradually decreasing length from the cantilevers to the central portion of the span.

3. A bridge structure including spaced towers, pipe cradles arranged therebetween, spaced main cables of catenary form extending over said towers and anchored at points spaced therefrom, downwardly converging suspenders connecting the main cables and pipe cradles, cantilever members mounted upon the towers and extending laterally therefrom, said cantilever members being positioned below said pipe cradles, inwardly curved wind cables connecting the outer ends of the cantilever members and anchored at points outwardly spaced therefrom, said wind cables being provided with vertical camber in their curves, wind guy suspenders connecting the wind cables with the cradles, said main cables and said wind cables forming upper and lower chords of truss bracing systems at each side of the longitudinal center of said cradles, said truss bracing system being formed of a plurality of diagonal cables secured to web members oppositely inclined in a plane through the main cable and wind cable, said wind cables, guy suspenders and diagonal web members each being tensioned flexible members.

WILDER KENAN.

References Cited in the file of this patent

UNITED STATES PATENTS

| Number | Name | Date |
|---|---|---|
| 1,143,866 | Sturgis | June 22, 1915 |
| 1,592,685 | Schachenmeier | July 13, 1926 |
| 2,221,919 | Kenan | Nov. 19, 1940 |

OTHER REFERENCES

Engineering News-Record, April 24, 1941, pages 64, 65.

Engineering News-Record, March 7, 1946, pages 91, 92, 93.